United States Patent
Gao et al.

(10) Patent No.: US 10,285,209 B2
(45) Date of Patent: May 7, 2019

(54) OPTIMIZING PROCESSING METHOD AND APPARATUS FOR D2D SERVICE

(71) Applicant: ZTE Corporation, Shenzhen, Guangdong Province (CN)

(72) Inventors: Yin Gao, Shenzhen (CN); Lin Chen, Shenzhen (CN); Dapeng Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 114 days.

(21) Appl. No.: 15/326,415

(22) PCT Filed: Sep. 12, 2014

(86) PCT No.: PCT/CN2014/086447
§ 371 (c)(1),
(2) Date: Jan. 13, 2017

(87) PCT Pub. No.: WO2015/117312
PCT Pub. Date: Aug. 13, 2015

(65) Prior Publication Data
US 2017/0202042 A1    Jul. 13, 2017

(30) Foreign Application Priority Data
Jul. 16, 2014   (CN) .......................... 2014 1 0340120

(51) Int. Cl.
*H04W 76/14* (2018.01)
*H04W 24/10* (2009.01)

(52) U.S. Cl.
CPC ........... *H04W 76/14* (2018.02); *H04W 24/10* (2013.01)

(58) Field of Classification Search
CPC .............................. H04W 76/14; H04W 24/10
See application file for complete search history.

(56) References Cited

U.S. PATENT DOCUMENTS

| | | | |
|---|---|---|---|
| 2010/0322213 A1* | 12/2010 | Liu | H04W 48/16 370/338 |
| 2014/0112301 A1* | 4/2014 | Shu | H04W 8/245 370/329 |

(Continued)

FOREIGN PATENT DOCUMENTS

CN   103152748   6/2013

OTHER PUBLICATIONS

Chinese Search Report PCT/CN2014/086447, dated Apr. 21, 2015.

*Primary Examiner* — Mohammad S Anwar
(74) *Attorney, Agent, or Firm* — Ferguson Case Orr Paterson, LLP

(57) ABSTRACT

An optimization processing method and apparatus for a D2D service are provided. The optimization processing method includes the following steps. D2D service information and/or service experience information about a terminal are/is acquired, wherein the service experience information is used for reflecting quality of a terminal user' experience on a current service. The D2D service information and/or service experience information are/is reported. By means of the above-mentioned technical solution, the technical problem that there is no solution for a terminal to report D2D service information and/or service experience information in the related art is solved, thereby implementing reporting of the D2D service information, improving the supervision capability of a network side on a D2D service, and providing a strong support for improving the user experience of the D2D service.

20 Claims, 7 Drawing Sheets

D2D service information about a terminal and/or service experience information about the terminal are/is acquired, wherein the service experience information is used for reflecting quality of a terminal user' experience on a current service — S302

The D2D service information and/or the service experience information are/is reported — S304

(56) References Cited

U.S. PATENT DOCUMENTS

2014/0162643 A1* 6/2014 Lee .................. H04W 4/06
  455/435.1
2015/0131540 A1* 5/2015 Koo .................. H04W 76/14
  370/329

* cited by examiner

US 10,285,209 B2

OPTIMIZING PROCESSING METHOD AND APPARATUS FOR D2D SERVICE

TECHNICAL FIELD

The present disclosure relates to the field of communications, and in particular to an optimization processing method and apparatus for a Device-to-Device (D2D) service.

BACKGROUND

With the development of a wireless multimedia service, demands of people on high data rate and user experience are increasing, so as to make a higher requirement on the system capacity and coverage of a traditional cellular network. In addition, popularity of applications such as a social network application, a close-distance data sharing application and a local advertisement application gradually increases demands of people on knowing of interested individuals or things nearby and communicating with the same (called as Proximity Services (ProSe)). The traditional cell-based cellular network is obviously restrictive in terms of high data rate and support of ProSe. Under the demand background, a D2D technology representative of a new development direction of a future communication technology emerges. Application of the D2D technology may alleviate burdens on the cellular network, reduce the power consumption of a battery of a User Equipment (UE), increase the data rate, improve the robustness of a network infrastructure, and well meet requirements of the above-mentioned high data rate service and ProSe.

The D2D technology may work at a licensed band or unlicensed band, to allow a plurality of UEs supporting a D2D function to conduct direct discovery/direct communication in the presence or absence of the network infrastructure. There are mainly three D2D application scenarios as shown in FIG. 1.

(1) A UE1 and a UE2 conduct data interaction under the coverage of the cellular network, and user plane data does not pass through the network infrastructure, as a mode 1 in FIG. 1.

(2) A UE in a weak-/no-coverage area conducts relay transmission, as a mode 2 in FIG. 1. A UE4 having a poorer signal quality is allowed to communicate with a network by means of a UE3 covered by the network nearby, and an operator can be assisted in coverage expansion and capacity increase.

(3) When the cellular network cannot normally work due to occurrence of an earthquake or emergency, devices are allowed to directly communicate with each other, as a mode 3 in FIG. 1. A control plane and a user plane among a UE5, a UE6 and a UE 7 do not conduct one-hop or multi-hop data communication via the network infrastructure.

The D2D technology usually includes a D2D discovery technology and a D2D communication technology.

(1) The D2D discovery technology refers to a technology for judging/determining mutual proximity between two or more D2D UEs (e.g., within a range of D2D direct communication) or for judging/determining proximity of a first UE to a second UE.

(2) The D2D communication technology refers to a technology capable of conducting direct communication of some or all pieces of communication data between D2D UEs without the network infrastructure.

D2D communication may reuse cellular communication resources. Under the scenario of coverage via the cellular network, D2D communication resources are usually scheduled and allocated by a base station, such that the resource reuse efficiency may be improved, and meanwhile, the effects of control of a network side over D2D communication and interference coordination between D2D communication and cellular communication are ensured. If an identical UE supports a D2D function, D2D communication between the UE and another D2D UE and cellular communication between the UE and the base station may be conducted simultaneously.

Meanwhile, in order to reduce the cost and complexity for conducting manual drive test by the operator via a dedicated device, a Third Generation Partnership Projects (3GPP) organization starts to introduce a Minimization of Drive Test (MDT) function at a Release-10 of a Universal Terrestrial Radio Access Network (UTRAN) and an Evolved UTRAN (E-UTRAN) system, an MDT architecture being shown in FIG. 2. The UTRAN includes a base station (also called as a Node B) and a Radio Network Controller (RNC), and a corresponding Core Network (CN) includes a Home Subscriber Server (HSS), a Mobile Switching Centre (MSC) server, and a Serving General Packet Radio Service (GPRS) Support Node (SGSN), and the like. The E-UTRAN includes an evolved Node B (eNB), and a corresponding CN includes an HSS, a Mobile Management Entity (MME) and the like. The MDT function automatically collects measurement information by using a UE, reports the information to a Radio Access Network (RAN) (referring to the RNC as for the UTRAN, and referring to the eNB as for the E-UTRAN) via a control plane signalling, and then reports the information to a Trace Collection Entity (TCE) of an Operation And Maintenance (OAM) system via the RAN. Application scenarios of an MDT mainly include coverage optimization, capacity optimization, mobility optimization, common channel parameter optimization, and the like.

In the related art, the MDT supports a management-based MDT and a signalling-based MDT. An activation process of the management-based MDT usually refers to: sending, by the OAM, a message to the eNB to activate MDT measurement of some UEs (taking the E-UTRAN system as an example, the same hereinafter), selecting, by the eNB, a UE according to received area information, and sending MDT configuration information to the selected UE. An activation process of the signalling-based MDT usually refers to: sending, by the OATM, a message to the HSS to activate MDT measurement of a certain UE, sending, by the HSS, MDT configuration information of the UE to the MME, sending, by the MME, the MDT configuration information of the UE to the eNB, and sending, by the eNB, the MDT configuration information to the UE finally. The signalling-based MDT usually specifies a certain UE by using an International Mobile Subscriber Identity (IMSI) or International Mobile Station Equipment Identity (IMEI), or adds area information to limit selection of the UE.

In the related art, the MDT supports MDT measurement of a UE in a connected state and an idle state, an MDT in the connected state is called as an immediate MDT, and an MDT in the idle state is called as a logged MDT. The immediate MDT refers to: conducting, by the UE, MDT measurement in the connected state according to MDT configuration information, reporting measurement information to the RAN in time, and then reporting the information to the TCE via the RAN. The logged MDT refers to: conducting, by the UE, MDT measurement in the idle state according to MDT configuration information, storing measurement information, reporting the information to the RAN till the UE enters the connected state subsequently, and then reporting the information to the TCE via the RAN. The UE may be equipped with two sets of independent configuration information namely the immediate MDT configuration information and the logged MDT configuration information. The two sets of MDT configuration information are both configured to the UE when the UE is in the connected state. Two types of MDT measurement configuration are different according to two different type contents namely immediate reporting and logged reporting. They both include an MDT application range which may be represented by a cell list or a TA list, tag information of a UE (only used for UE-based trace in a UMTS), and MDT measurement contents. The immediate MDT also needs to contain a report trigger event, a report interval, and a report quantity. The logged MDT includes a log record interval and log configuration duration time.

Meanwhile, in the related art, during D2D discovery or communication between terminals, any technology enabling a UE to record and report self-experienced D2D service information or experience information has not existed yet at present, which makes a network side unable to effectively manage a D2D terminal service and does not facilitate optimization of a D2D service.

There is not an effective solution yet for the above-mentioned problems in the related art.

SUMMARY

The present disclosure provides an optimization processing method and apparatus for a D2D service, which are intended to at least solve the above-mentioned technical problem that there is no solution for a terminal to report D2D service information and/or service experience information in the related art.

According to an embodiment of the present disclosure, an optimization processing method for a D2D service is provided, which may include that: D2D service information and/or service experience information about a terminal are/is acquired, wherein the service experience information is used for reflecting quality of a terminal user' experience on a current service; and the D2D service information and/or service experience information are/is reported.

Preferably, the D2D service information may include at least one of followings: a service type, a serving Public Land Mobile Network (PLMN) of the terminal or a PLMN list allowed by the terminal, frequency point information of a D2D service, a resource allocation type for D2D discovery, a resource allocation type for D2D communication, a D2D communication type, D2D service related time information, and signal quality information or position information of D2D service recording time.

Preferably, the D2D service recording time may include at least one of followings: starting time of a D2D service carried out by the terminal, stopping time of the D2D service, and any time between the starting time and stopping time of the D2D service.

Preferably, the D2D service related time information may include at least one of followings: service starting time, service stopping time, and service duration time.

Preferably, the service experience information may include at least one of followings: Quality of Service (QoS) measurement information about D2D communication, an average rate of a D2D communication service, a maximum rate of the D2D communication service, a minimum rate of the D2D communication service, a priority of the D2D communication service, D2D service type information, a D2D service block error rate, a D2D service packet error rate, a D2D service bit error rate, D2D discovery range information, and a number of adjacent terminals discovered by a terminal under a D2D discovery service within unit time.

According to a further embodiment of the present disclosure, an optimization processing method for a D2D service is also provided, which may include that: a terminal receives first service measurement configuration information from a network side; the terminal acquires D2D service information and/or service experience information about the terminal according to the first service measurement configuration information, wherein the service experience information is used for reflecting quality of a terminal user' experience on a current service; and the terminal reports the D2D service information and/or the service experience information to the network side.

Preferably, the D2D service information may include at least one of followings: a service type, a serving PLMN of the terminal or a PLMN list allowed by the terminal, frequency point information of a D2D service, a resource allocation type for D2D discovery, a resource allocation type for D2D communication, a D2D communication type, D2D service related time information, and signal quality information or position information of D2D service recording time.

Preferably, the service experience information may include at least one of followings: QoS measurement information about D2D communication, an average rate of a D2D communication service, a maximum rate of the D2D communication service, a minimum rate of the D2D communication service, a priority of the D2D communication service, D2D service type information, a D2D service block error rate, a D2D service packet error rate, a D2D service bit error rate, D2D discovery range information, and a number of adjacent terminals discovered by a terminal under a D2D discovery service within unit time.

Preferably, the step that the terminal receives the first service measurement configuration information from the network side may include one of the steps that: the terminal receives a configuration message, dedicated to sending the first service measurement configuration information, from the network side; the terminal acquires the first service measurement configuration information from the configuration message; the terminal receives a cell broadcast message of the network side; and the terminal acquires the first service measurement configuration information from the cell broadcast message.

Preferably, after the terminal reports the D2D service information and/or the service experience information to the network side, the method may further include that: when receiving the first service measurement configuration information again, the terminal re-acquires the D2D service information and/or the service experience information, or is prohibited from acquiring the D2D service information and/or the service experience information.

Preferably, when the terminal acquires the D2D service information and/or service experience information about the terminal according to the first service measurement configuration information, the method may further include that: the terminal receives a second service measurement configuration message; the terminal stops current measurement and discards the D2D service information and/or service experience information measured and recorded currently; and the terminal re-acquires D2D service information and/or service experience information according to the second service measurement configuration message, or the terminal still acquires the D2D service information and/or service experience information according to the first service measurement configuration information.

Preferably, after the terminal acquires the D2D service information and/or service experience information about the terminal according to the first service measurement configuration information, the method may further include that: the terminal receives a third service measurement configuration message; the terminal re-acquires D2D service information and/or service experience information according to the third service measurement configuration message; and the terminal replaces the D2D service information and/or service experience information, acquired according to the first service measurement configuration information, with the re-acquired D2D service information and/or service experience information.

Preferably, the network side may include: an eNB in a Long Term Evolution (LTE) system or an RNC under a UTRAN.

According to a further embodiment of the present disclosure, an optimization processing method for a D2D service is also provided, which may include that: a network side sends service measurement configuration information to a terminal; and the network side receives D2D service information and/or service experience information acquired, by the terminal, according to the service measurement configuration information, wherein the service experience information is used for reflecting quality of a terminal user' experience on a current service.

According to a further embodiment of the present disclosure, an optimization processing method for a D2D service is also provided, which may include that: an eNB receives service measurement configuration information from an MME or a network manager; the eNB selects an appropriate terminal to acquire D2D service information and/or service experience information, wherein the service experience information is used for reflecting quality of a terminal user' experience on a current service; and the eNB locally processes the D2D service information and/or service experience information from the terminal, or sends the D2D service information and/or service experience information from the terminal to a TCE or a D2D service management network element.

Preferably, the MME may include: a network element of a CN in a UTRAN; and/or, the eNB may include: an RNC in the UTRAN; and/or the D2D service management network element may include: a ProSe functional entity or a network element device dedicated to D2D service management.

According to a further embodiment of the present disclosure, an optimization processing apparatus for a D2D service is also provided, which may include: an acquisition module, configured to acquire D2D service information and/or service experience information about a terminal, wherein the service experience information is used for reflecting quality of a terminal user' experience on a current service; and a reporting module, configured to report the D2D service information and/or service experience information.

According to a further embodiment of the present disclosure, an optimization processing apparatus for a D2D service is also provided, which may be applied to a terminal and may include: a receiving module, configured to receive first service measurement configuration information from a network side; an acquisition module, configured to acquire D2D service information and/or service experience information about the terminal according to the first service measurement configuration information, wherein the service experience information is used for reflecting quality of a terminal user' experience on a current service; and a reporting module, configured to report the D2D service information and/or the service experience information to the network side.

According to a further embodiment of the present disclosure, an optimization processing apparatus for a D2D service is also provided, which may be applied to a network side and may include: a sending module, configured to send service measurement configuration information to a terminal; and a receiving module, configured to receive D2D service information and/or service experience information acquired, by the terminal, according to the service measurement configuration information, wherein the service experience information is used for reflecting quality of a terminal user' experience on a current service.

According to a further embodiment of the present disclosure, an optimization processing apparatus for a D2D service is also provided, which may be applied to an eNB and may include: a receiving module, configured to receive service measurement configuration information from an MME or a network manager; a selection module, configured to select an appropriate terminal to acquire D2D service information and/or service experience information, wherein the service experience information is used for reflecting quality of a terminal user' experience on a current service; and a processing module, configured to locally process the D2D service information and/or service experience information from the terminal, or send the D2D service information and/or service experience information from the terminal to a TCE or a D2D service management network element.

By means of the present disclosure, a technical means of reporting acquired D2D service information and/or service experience information about a terminal is adopted. The technical problem that there is no solution for a terminal to report D2D service information and/or service experience information in the related art is solved, thereby implementing reporting of the D2D service information, improving the supervision capability of a network side on a D2D service, and providing a strong support for improving the user experience of the D2D service.

BRIEF DESCRIPTION OF THE DRAWINGS

The accompanying drawings described herein are intended to provide further understanding of the present disclosure, and form a part of the present application. The schematic embodiments and descriptions of the present disclosure are intended to explain the present disclosure, and do not form improper limits to the present disclosure. In the accompanying drawings.

DETAILED DESCRIPTION OF THE EMBODIMENTS

The present disclosure will be described below with reference to the accompanying drawings and in conjunction with the embodiments in detail. It is important to note that the embodiments in the present application and the features in the embodiments may be combined under the condition of no conflicts.

In the related art, during D2D discovery or communication between terminals, any technology, enabling a UE to record and report self-experienced D2D service information or experience information in order that a network side may conduct analysis and adjustment according to the information reported by the UE so as to improve the network D2D service experience or provide a data model of a D2D service in a network for an operator, has not existed yet at present. For the above-mentioned problem, the embodiment of the present disclosure provides a corresponding solution, which will be elaborated hereinbelow.

Embodiment 1

Figure 1:
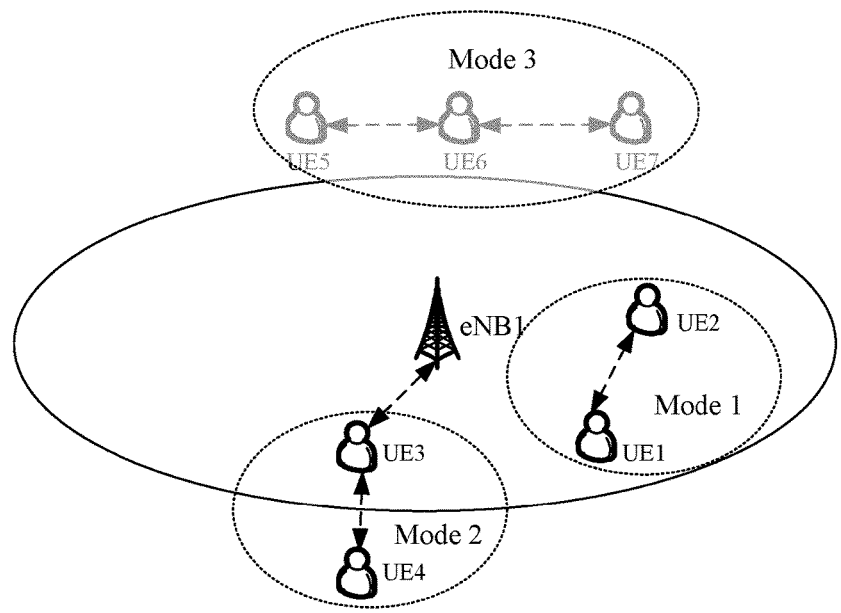
FIG. 1 is a D2D application scenario diagram according to the related art.
Figure 2:
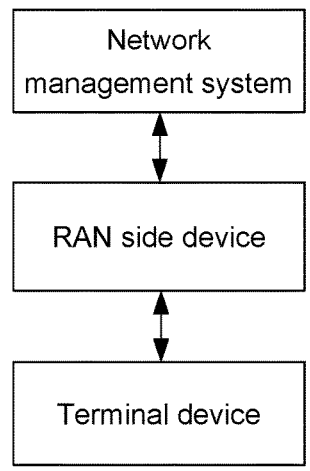
FIG. 2 is an MDT architecture diagram according to the related art.
Figure 3:
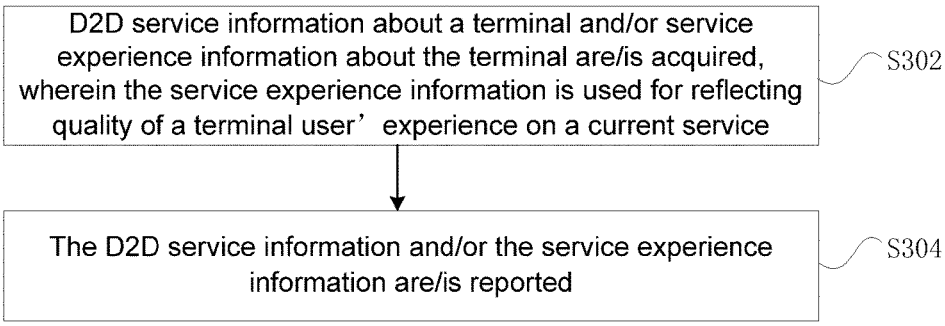
FIG. 3 is a flowchart of an optimization processing method for a D2D service according to an embodiment 1 of the present disclosure.

FIG. 3 is a flowchart of an optimization processing method for a D2D service according to an embodiment 1 of the present disclosure. As shown in FIG. 3, the method includes the following steps.

Step S302: D2D service information and/or service experience information about a terminal are/is acquired, wherein the service experience information is used for reflecting quality of a terminal user' experience on a current service.

Step S304: The D2D service information and/or service experience information are/is reported.

By means of the above-mentioned processing steps, the acquired D2D service information and/or service experience information may be reported, and therefore a related network element may learn of the D2D service information and/or service experience information, thereby improving the supervision capability of a network side on a D2D service, and providing a strong support for improving the user experience of the D2D service.

In another embodiment, the quality of a terminal user' experience on a current service may also be expressed as a user experience effect or user feeling under some situations.

In another implementation mode of the present embodiment, the D2D service information may include, but is not limited to, at least one of followings:

service types: D2D discovery, D2D communication or, receiving of D2D discovery, sending of D2D discovery, receiving of D2D communication, and sending of D2D communication;

a serving PLMN of the terminal or a PLMN list allowed by the terminal;

frequency point information of a D2D service;

resource allocation types for D2D discovery: TYPE1 or TYPE2;

resource allocation type modes for D2D communication: MODE1 and MODE2, optionally, it may also contain a communication group ID;

D2D communication types: unicast, multicast, and broadcast;

D2D service related time information: service starting time, service stopping time, service duration time, and the like;

signal quality information of D2D service recording time: Reference Signal Receiving Power (RSRP) information of a serving cell, Reference Signal Receiving Quality (RSRQ) information of the serving cell, and signal quality information of a surrounding neighbour cell (including an intra- or cross-system neighbour cell); and position information of D2D service recording time: an EUTRAN Cell Global Identifier (ECGI) of a current serving cell, and/or Global Position System (GPS) information, and/or other pieces of information capable of assisting in positioning implementation. The service recording time information includes at least one of followings: starting time of a D2D service carried out by the terminal, stopping time of the D2D service, and any time between the starting time and stopping time of the D2D service.

In another implementation mode of the present embodiment, the experience quality of the terminal user on the current service in Step S302 may be expressed via the service experience information, wherein the service experience information includes, but is not limited to, at least one of followings:

QoS measurement information about D2D communication: such as, a throughput rate of a service, a service throughput and the like;

an average rate of a D2D communication service;

a maximum rate of the D2D communication service;

a minimum rate of the D2D communication service;

a priority of the D2D communication service;

D2D service type information, which is expressed, for example, via QoS Class Identifier (QCI) information of the service;

a D2D service block error rate;

a D2D service packet error rate;

a D2D service bit error rate;

D2D discovery range information; and a number of adjacent terminals discovered by a terminal under a D2D discovery service within unit time.

In order to facilitate understanding, provided are illustrations herein: when the average rate of the D2D communication service is higher, it may be shown that the experience quality of the user is better, whereas the experience quality is poorer; and when the D2D service block error rate is lower, it may be shown that the experience quality of the user is better.

Figure 4:
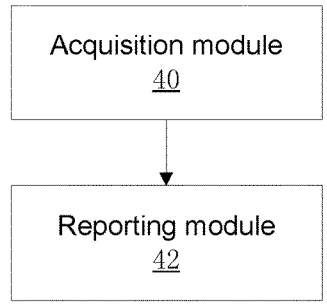
FIG. 4 is a structure block diagram of an optimization processing apparatus for a D2D service according to an embodiment 1 of the present disclosure.

In the present embodiment, an optimization processing apparatus for a D2D service is also provided, which is configured to implement the above-mentioned method. As shown in FIG. 4, the apparatus includes:
- an acquisition module 40, configured to acquire D2D service information and/or service experience information about a terminal; and
- a reporting module 42, connected to the acquisition module 40, and configured to report the D2D service information and/or service experience information.

Embodiment 2

Figure 5:
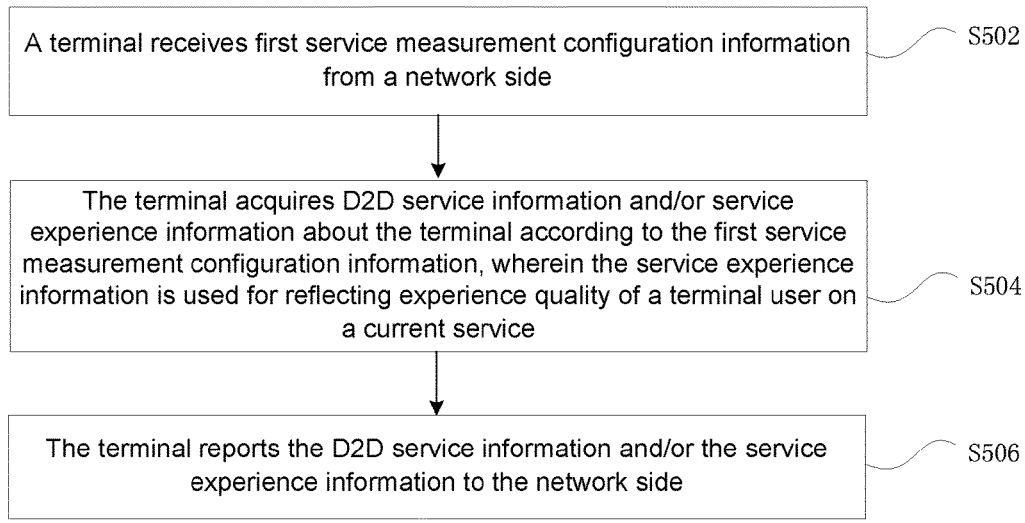
FIG. 5 is a flowchart of an optimization processing method for a D2D service according to an embodiment 2 of the present disclosure.

FIG. 5 is a flowchart of an optimization processing method for a D2D service according to an embodiment 2 of the present disclosure. As shown in FIG. 5, the method includes the following processing steps.

Step S502: A terminal receives first service measurement configuration information from a network side.

Step S504: The terminal acquires D2D service information and/or service experience information about the terminal according to the first service measurement configuration information, wherein the service experience information is used for reflecting quality of a terminal user' experience on a current service.

Step S506: The terminal reports the D2D service information and/or the service experience information to the network side.

In another implementation mode of the present embodiment, the D2D service information includes, but is not limited to, at least one of followings:
- service types: D2D discovery, D2D communication or, receiving of D2D discovery, sending of D2D discovery, receiving of D2D communication, and sending of D2D communication;
- a serving PLMN of the terminal or a PLMN list allowed by the terminal;
- frequency point information of a D2D service;
- resource allocation types for D2D discovery: TYPE1 or TYPE2;
- resource allocation type modes for D2D communication: MODE1 and MODE2, optionally, it may also contain a communication group ID;
- D2D communication types: unicast, multicast, and broadcast;
- D2D service related time information: service starting time, service stopping time, service duration time, and the like;
- signal quality information of D2D service recording time: RSRP information of a serving cell, RSRQ information of the serving cell, and signal quality information of a surrounding neighbour cell (including an intra- or cross-system neighbour cell); and
- position information of D2D service recording time: an ECGI of a current serving cell, and/or GPS information, and/or other pieces of information capable of assisting in positioning implementation. The service recording time information includes at least one of followings: starting time of a D2D service carried out by the terminal, stopping time of the D2D service, and any time between the starting time and stopping time of the D2D service.

The service experience information includes, but is not limited to, at least one of followings: QoS measurement information about D2D communication, an average rate of a D2D communication service, a maximum rate of the D2D communication service, a minimum rate of the D2D communication service, a priority of the D2D communication service, D2D service type information, a D2D service block error rate, a D2D service packet error rate, a D2D service bit error rate, D2D discovery range information, and a number of adjacent terminals discovered by a terminal under a D2D discovery service within unit time.

There are many implementation modes of Step S502. For example, Step S502 may be implemented by means of one of the modes that:

(1) the terminal receives a configuration message, dedicated to sending the first service measurement configuration information, from the network side, and the terminal acquires the first service measurement configuration information from the configuration message; and (2) the terminal receives a cell broadcast message of the network side, and the terminal acquires the first service measurement configuration information from the cell broadcast message.

In the present embodiment, after the terminal reports the D2D service information and/or the service experience information to the network side, the terminal may execute the following operations: when the terminal receives the first service measurement configuration information again, re-acquiring the D2D service information and/or the service experience information, or prohibiting from acquiring the D2D service information and/or the service experience information.

When the terminal acquires the D2D service information and/or service experience information about the terminal according to the first service measurement configuration information, the terminal may execute the operations that: the terminal receives a second service measurement configuration message; the terminal stops current measurement and discards the D2D service information and/or service experience information measured and recorded currently; and the terminal re-acquires D2D service information and/or service experience information according to the second service measurement configuration message, or the terminal still acquires the D2D service information and/or service experience information according to the first service measurement configuration information.

After the terminal acquires the D2D service information and/or service experience information about the terminal according to the first service measurement configuration information, the terminal receives a third service measurement configuration message; the terminal re-acquires D2D service information and/or service experience information according to the third service measurement configuration message; and the terminal replaces the D2D service information and/or service experience information, acquired according to the first service measurement configuration information, with the re-acquired D2D service information and/or service experience information.

In another implementation mode of the present embodiment, the network side includes: an eNB in an LTE system or an RNC under a UTRAN.

Figure 6:
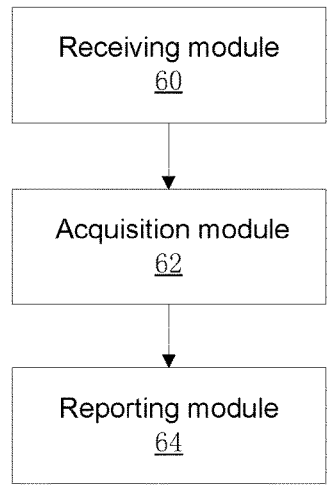
FIG. 6 is a structure block diagram of an optimization processing apparatus for a D2D service according to an embodiment 2 of the present disclosure.

In the present embodiment, an optimization processing apparatus for a D2D service is also provided, which is configured to implement the above-mentioned method and applied to a terminal. As shown in FIG. 6, the apparatus includes:

a receiving module 60, configured to receive first service measurement configuration information from a network side;

an acquisition module 62, connected to the receiving module 60, and configured to acquire D2D service information and/or service experience information about the terminal according to the first service measurement configuration information, wherein the service experience information is used for reflecting quality of a terminal user' experience on a current service; and a reporting module 64, connected to the acquisition module 62, and configured to report the D2D service information and/or the service experience information to the network side.

Embodiment 3

Figure 7:
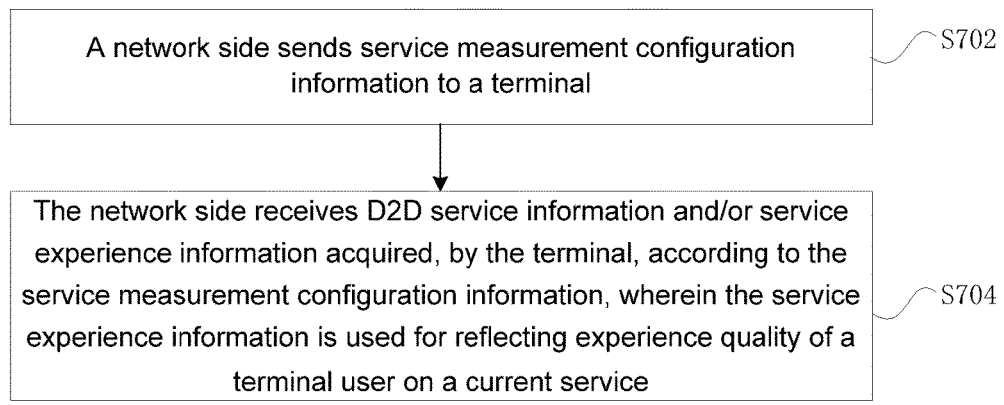
FIG. 7 is a flowchart of an optimization processing method for a D2D service according to an embodiment 2 of the present disclosure.

FIG. 7 is a flowchart of an optimization processing method for a D2D service according to an embodiment 2 of the present disclosure. As shown in FIG. 7, the method includes the following steps.

Step S702: A network side sends service measurement configuration information to a terminal.

Step S704: The network side receives D2D service information and/or service experience information acquired, by the terminal, according to the service measurement configuration information, wherein the service experience information is used for reflecting quality of a terminal user' experience on a current service.

Figure 8:
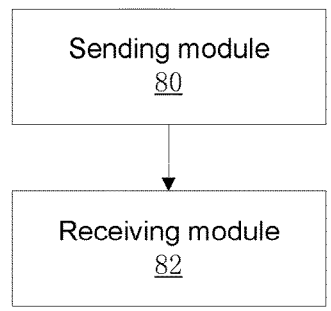
FIG. 8 is a structure block diagram of an optimization processing apparatus for a D2D service according to an embodiment 2 of the present disclosure.

In the present embodiment, an optimization processing apparatus for a D2D service is also provided, which is configured to implement the above-mentioned method and applied to a network side. As shown in FIG. 8, the apparatus includes:

a sending module 80, configured to send service measurement configuration information to a terminal; and a receiving module 82, connected to the sending module 80, and configured to receive D2D service information and/or service experience information acquired, by the terminal, according to the service measurement configuration information, wherein the service experience information is used for reflecting quality of a terminal user' experience on a current service.

Embodiment 4

Figure 9:
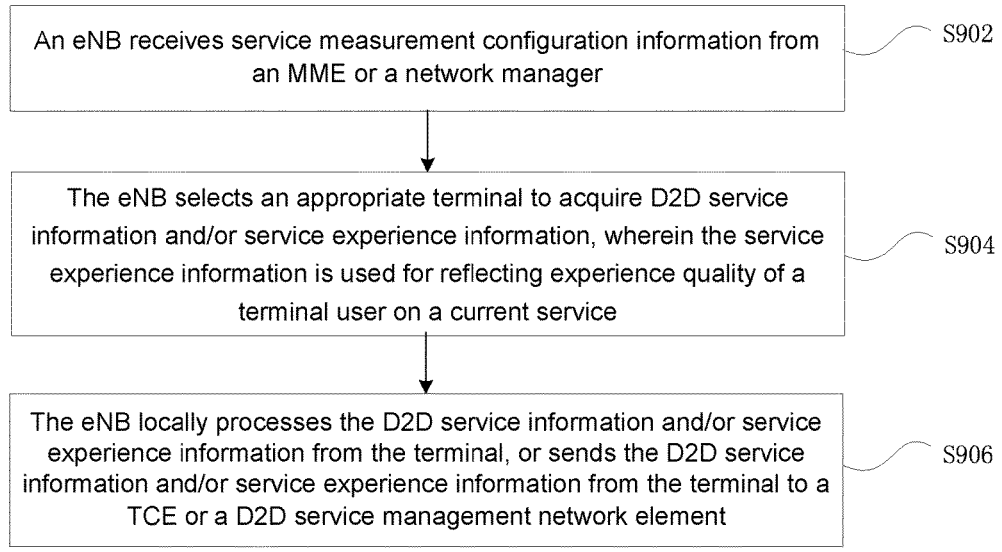
FIG. 9 is a flowchart of an optimization processing method for a D2D service according to an embodiment 3 of the present disclosure.

FIG. 9 is a flowchart of an optimization processing method for a D2D service according to an embodiment 3 of the present disclosure. As shown in FIG. 9, the method includes the following processing steps.

Step S902: An eNB receives service measurement configuration information from an MME or a network manager.

Step S904: The eNB selects an appropriate terminal to acquire D2D service information and/or service experience information, wherein the service experience information is used for reflecting quality of a terminal user' experience on a current service.

Step S906: The eNB locally processes the D2D service information and/or service experience information from the terminal, or sends the D2D service information and/or service experience information from the terminal to a TCE or a D2D service management network element.

Preferably, the MME includes: a network element of a CN in a UTRAN; and/or, the eNB may include: an RNC in the UTRAN; and/or the D2D service management network element may include: a ProSe functional entity or a network element device dedicated to D2D service management (the network element device may be an additional network element device).

Figure 10:
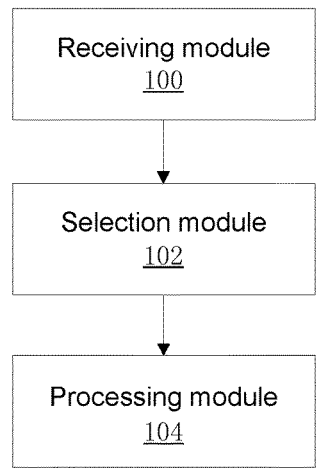
FIG. 10 is a structure block diagram of an optimization processing apparatus for a D2D service according to an embodiment 4 of the present disclosure.

In the present embodiment, an optimization processing apparatus for a D2D service is also provided, which is applied to an eNB. As shown in FIG. 10, the apparatus includes:

a receiving module 100, configured to receive service measurement configuration information from an MME or a network manager;

a selection module 102, connected to the receiving module 100, and configured to select an appropriate terminal to acquire D2D service information and/or service experience information; and a processing module 104, connected to the selection module 102, and configured to locally process the D2D service information and/or service experience information from the terminal, or send the D2D service information and/or service experience information from the terminal to a TCE or a D2D service management network element.

In order to better understand the above-mentioned embodiments 1-4, embodiments 5-9 are adopted hereinbelow for detailed description.

Embodiment 5

Figure 11:
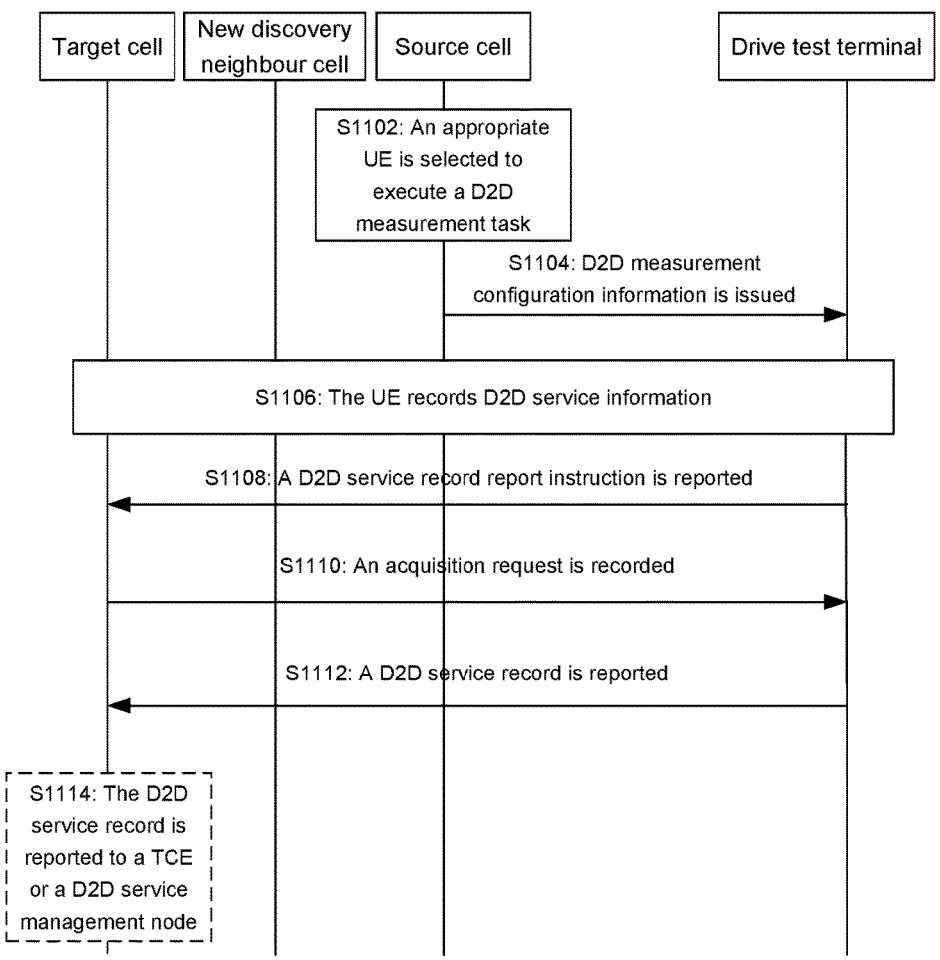
FIG. 11 is a flow diagram showing reporting of D2D service information using an MDT mechanism according to an embodiment 5 of the present disclosure.

The present embodiment provides a flow of reporting D2D service information using an MDT mechanism. As shown in FIG. 11, the flow includes the following processing steps.

Step S1102: A network side selects an appropriate UE (i.e., a drive test terminal) to execute a D2D measurement task.

Step S1104: The network side issues D2D measurement configuration information to the drive test terminal.

Step S1106: The UE records D2D service information.

Step S1108: The UE reports a D2D service record report instruction.

Step S1110: An acquisition request is recorded.

Step S1112: A D2D service record is reported.

Step S1114: The D2D service record is reported to a TCE or a D2D service management node.

Embodiment 6

Figure 12:
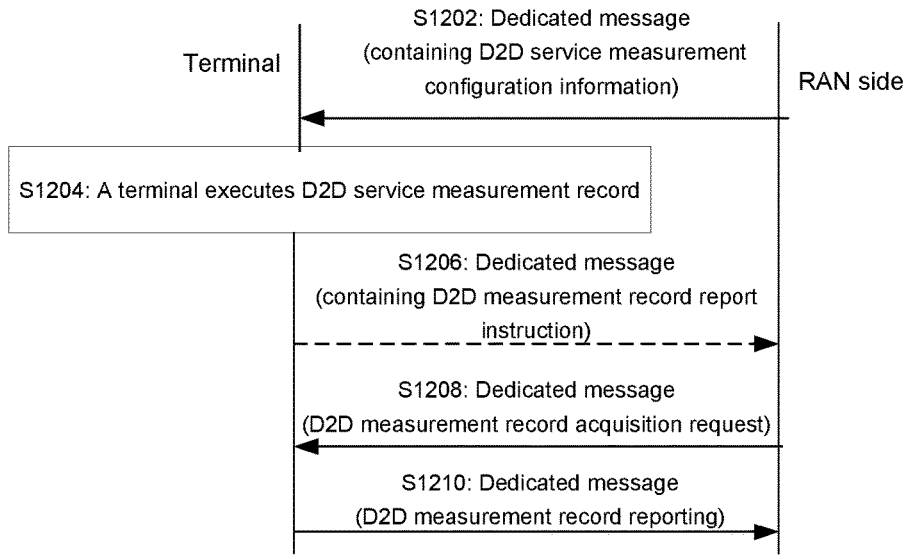
FIG. 12 is a flowchart of a D2D service information recording air interface flow method according to an embodiment 6 of the present disclosure.

In the present embodiment, measurement configuration is issued by using a dedicated message. As shown in FIG. 12, the flow includes the following processing steps.

Step S1202: A network side issues D2D service measurement configuration information to a terminal by means of a dedicated drive test configuration message (which may be a Logged Measurements Configuration message in an LTE system), wherein the D2D service measurement configuration information not only contains an MDT measurement area range, configuration duration time and/or record interval contained in existing MDT log configuration information, but also may contain D2D MDT special configuration information, which contains, but is not limited to, one or more of the following contents: a D2D measurement task type (such as a specified report D2D log report type: discovery or communication, or both reporting), a D2D service measurement frequency, a D2D service measurement state (a terminal records in an idle state and/or connected state), a D2D MDT measurement record instruction (for instructing the terminal to perform D2D service measurement record) and the like.

Step S1204: After receiving drive test configuration information, the terminal locally stores and processes the drive test configuration information. The measurement configuration comes into effect, and the terminal executes D2D service measurement and performs recording and storage in an IDLE state and/or connected state. The terminal checks whether a current area falls within a configuration range, and performs D2D service measurement record only within a configuration effective area range.

Step S1206: When entering or undergoing the connected state, the terminal reports a D2D service measurement report instruction to a base station via an RRC dedicated signalling, wherein the instruction information may be carried by means of an RRC Connection Reconfiguration Complete message, an RRC Connection Reestablishment Complete message, and an RRC Connection Setup Complete message.

Step S1208: The base station requests, according to own situations, to acquire a D2D service measurement record reported by a UE. After the network side obtains an instruction notification reported by the terminal, if reporting is needed, the network side may request, via a UE Information Request message, the terminal to report a drive test measurement result.

Step S1210: The terminal reports the measurement result via a UE Information Response message.

Embodiment 7

Figure 13:
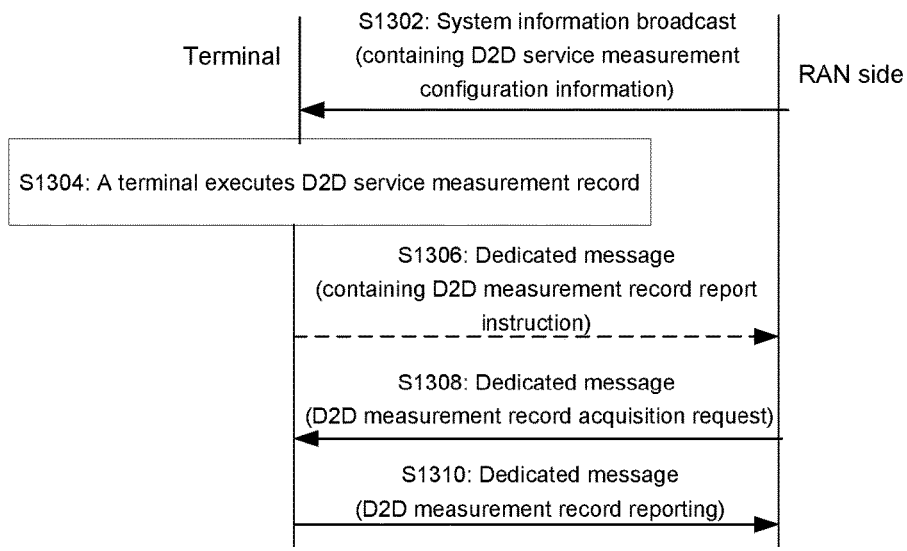
FIG. 13 is a flowchart of a D2D service information recording air interface flow method according to an embodiment 7 of the present disclosure.

The present embodiment mainly implements sending of measurement configuration using a broadcast message, as shown in FIG. 13.

Step S1302: A network side issues, via a cell broadcast, D2D service measurement configuration information, containing D2D MDT special configuration information, which contains, but is not limited to, one or more of the following contents: a D2D MDT measurement record instruction (for instructing a terminal to perform D2D service measurement record), a D2D service measurement frequency, and the like.

Step S1304: After receiving drive test configuration information, the terminal locally stores and processes the drive test configuration information. The measurement configuration comes into effect, and the terminal executes D2D service measurement and performs recording and storage in an IDLE state and/or connected state. The terminal checks whether a current area falls within a configuration range, if the measurement configuration information does not contain configuration area information, the terminal may perform D2D service measurement record only under an RPLMN or SPLMN of a current UE.

Step S1306: When entering or undergoing the connected state, the terminal reports a D2D service measurement report instruction to a base station via an RRC dedicated signalling, wherein the instruction information may be carried by means of an RRC Connection Reconfiguration Complete message, an RRC Connection Reestablishment Complete message, and an RRC Connection Setup Complete message.

Step S1308: The base station requests, according to own situations, to acquire a D2D service measurement record reported by a UE. After the network side obtains an instruction notification reported by the terminal, if reporting is needed, the network side may request, via a UE Information Request message, the terminal to report a drive test measurement result.

Step S1310: The terminal reports the measurement result via a UE Information Response message. When reporting the D2D service record information, the terminal needs to consider whether a current serving PLMN falls within a configuration effective range. For example, when the current serving PLMN is consistent with a serving PLMN attached during configuration issuing, the terminal may perform reporting. Or, only when the current serving PLMN falls within the configuration effective range, the terminal may perform reporting.

Embodiment 8

Figure 14:
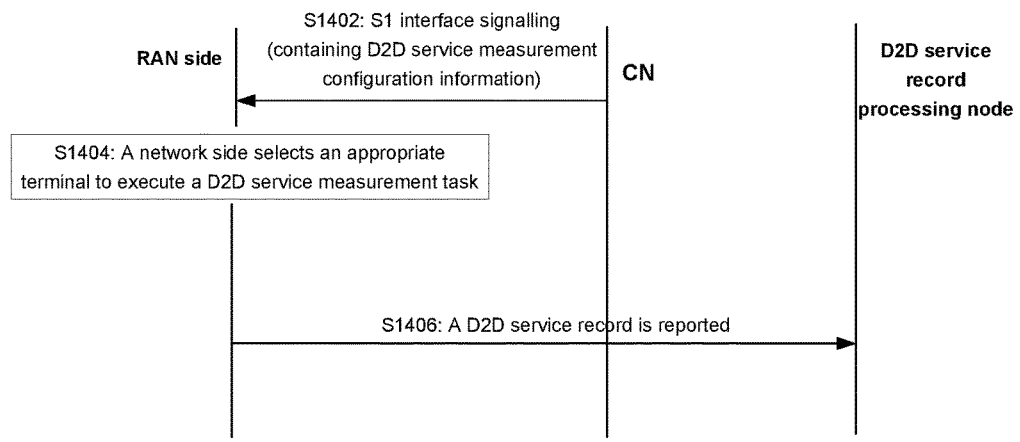
FIG. 14 is a flowchart of a D2D service information recording interface flow method according to an embodiment 8 of the present disclosure.

A D2D service information record air interface flow provided by the present embodiment is as shown in FIG. 14.

Step S1402: An MME sends, via an S1 interface, D2D service measurement configuration information to an eNB serving a certain terminal. The MME may issue the D2D service measurement configuration information to a base station via an INITIAL CONTEXT SETUP REQUEST, TRACE START, S1 HANDOVER REQUEST message or an additional message, wherein the D2D service measurement configuration information not only contains an MDT measurement area range, configuration duration time and/or record interval contained in existing MDT log configuration information, but also may contain D2D MDT special configuration information, which contains, but is not limited to, one or more of the following contents: a D2D measurement task type (such as a specified report D2D log report type: discovery or communication, or both reporting), a D2D service measurement frequency, a D2D service measurement state (a terminal records in an idle state and/or connected state), a D2D MDT measurement record instruction (for instructing the terminal to perform D2D service measurement record) and the like.

Step S1404: After the eNB receives the D2D service measurement configuration information, the eNB selects an appropriate UE to perform D2D service measurement record according to configuration information, UE capability and other pieces of information, and forwards the D2D service measurement configuration information to the appropriate UE.

Step S1406: After receiving D2D service information reported by the terminal, the eNB locally processes the D2D service information or sends the D2D service information to a TCE or sends the D2D service information to a D2D service management network element. The eNB receiving the D2D service record information reported by the UE and the eNB issuing the D2D service measurement configuration information may be identical or may be different.

Embodiment 9

Figure 15:
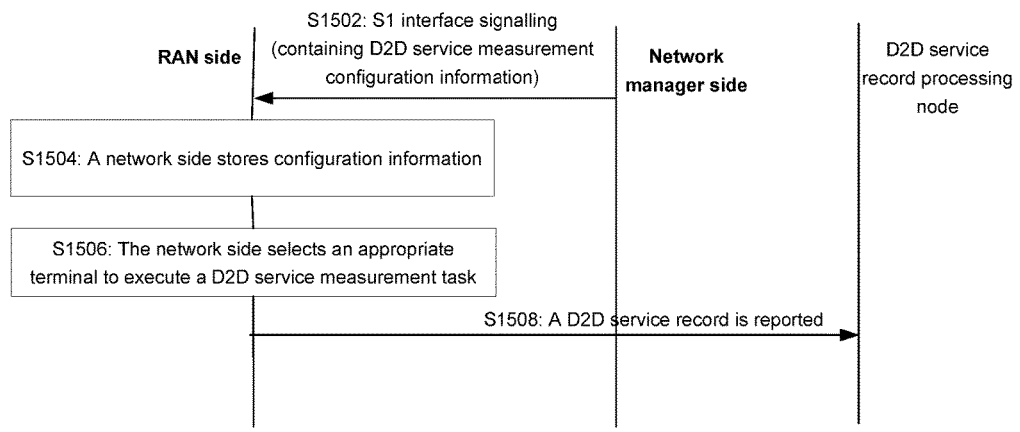
FIG. 15 is a flowchart of a D2D service information recording interface flow method according to an embodiment 9 of the present disclosure.

A D2D service information record air interface flow provided by the present embodiment is as shown in FIG. 15.

Step S1502: An EM informs an eNB via a Trace Session Activation message, activates MDT measurement, and issues D2D service measurement configuration information to a base station, wherein the D2D service measurement configuration information not only contains an MDT measurement area range, configuration duration time and/or record interval contained in existing MDT log configuration information, but also may contain D2D MDT special configuration information, which contains, but is not limited to, one or more of the following contents: a D2D measurement task type (such as a specified report D2D log report type: discovery or communication, or both reporting), a D2D service measurement frequency, a D2D service measurement state (a terminal records in an idle state and/or connected state), a D2D MDT measurement record instruction (for instructing the terminal to perform D2D service measurement record) and the like.

Step S1504: After receiving a Trace Session activation request message from the EM, the eNB should start a Trace Session and store related parameters.

Step S1506: The eNB should activate an MDT function for a selected UE. When the eNB selects a UE, a UE capability and a D2D service measurement configuration area range should be taken into consideration. If the UE does not support D2D service measurement record or a user is out of the measurement configuration area range, the UE should not be selected to collect D2D service data.

Step S1508: After receiving D2D service information reported by the terminal, the eNB locally processes the D2D service information or sends the D2D service information to a TCE or sends the D2D service information to a D2D service management network element. The eNB receiving the D2D service record information reported by the UE and the eNB issuing the D2D service measurement configuration information may be identical or may be different.

In the above-mentioned embodiments 5-9:
preferably, the terminal needs to have a D2D drive test capability.

Preferably, if the terminal successfully reports a D2D service record within D2D service measurement configuration effective time, the terminal may re-perform D2D service measurement record without influence of the previous record.

Preferably, if the terminal successfully reports a D2D service record within the D2D service measurement configuration effective time, the terminal may not execute a D2D service measurement task any longer subsequently.

Preferably, if the terminal receives new D2D service measurement configuration within the D2D service measurement configuration effective time, the terminal stops the previous measurement, discards the previous measurement record, and starts new D2D service measurement and record. Or, the terminal omits the subsequent measurement configuration till the previous measurement configuration fails.

Preferably, if the base station receives new D2D service measurement configuration within the D2D service measurement configuration effective time, the base station may cover the previous measurement configuration. Or the base station omits the subsequent measurement configuration till the previous measurement configuration fails.

Preferably, in the above-mentioned method, the network side refers to an eNB under an LTE system, and refers to an RNC under a UTRAN system. In the embodiments 3 and 4, the LTE system is taken as an example, under the UTRAN system, the MME may be a CN, and the eNB may be the RNC.

Preferably, the D2D service management network element may be a ProSe Function or a new network element device.

Obviously, those skilled in the art should understand that all modules or all steps in the present disclosure may be implemented by using a general calculation apparatus, may be centralized on a single calculation apparatus or may be distributed on a network composed of a plurality of calculation apparatuses. Optionally, they may be implemented by using executable program codes of the calculation apparatuses. Thus, they may be stored in a storage apparatus and executed by the calculation apparatuses, the shown or described steps may be executed in a sequence different from the sequence under certain conditions, or they are manufactured into each integrated circuit module respectively, or a plurality of modules or steps therein is manufactured into a single integrated circuit module. Thus, the present disclosure is not limited to combination of any specific hardware and software.

The above is only the preferred embodiments of the present disclosure, and not intended to limit the present disclosure. There may be various modifications and variations in the present disclosure for those skilled in the art. Any modifications, equivalent replacements, improvements and the like within the spirit and principle of the present disclosure shall fall within the protective scope of the present disclosure.

INDUSTRIAL APPLICABILITY

According to the above-mentioned technical solution provided by the embodiment of the present disclosure, a technical means of reporting acquired D2D service information and/or service experience information about a terminal is adopted. The technical problem that there is no solution for a terminal to report D2D service information and/or service experience information in the related art, thereby implementing reporting of the D2D service information, improving the supervision capability of a network side on a D2D service, and providing a strong support for improving the user experience of the D2D service.

What is claimed is:

1. An optimization processing method for a Device-to-Device (D2D) service, comprising:
   acquiring, by a terminal, D2D service information about the terminal and service experience information about the terminal, or the service experience information, wherein the service experience information is used for reflecting quality of a terminal user' experience on a current service; and
   reporting, by the terminal, the D2D service information and the service experience information, or the service experience information to a network side.

2. The method according to claim 1, wherein the D2D service information comprises at least one of followings:
   a service type, a serving Public Land Mobile Network (PLMN) of the terminal or a PLMN list allowed by the terminal, frequency point information of a D2D service, a resource allocation type for D2D discovery, a resource allocation type for D2D communication, a D2D communication type, D2D service related time information, and signal quality information or position information of D2D service recording time.

3. The method according to claim 2, wherein the D2D service recording time comprises at least one of followings:
   starting time of a D2D service carried out by the terminal, stopping time of the D2D service, and any time between the starting time and stopping time of the D2D service.

4. The method according to claim 2, wherein the D2D service related time information comprises at least one of followings:
   service starting time, service stopping time, and service duration time.

5. The method according to claim 1, wherein the service experience information comprises at least one of followings:
   Quality of Service (QoS) measurement information about D2D communication, an average rate of a D2D communication service, a maximum rate of the D2D communication service, a minimum rate of the D2D communication service, a priority of the D2D communication service, D2D service type information, a D2D service block error rate, a D2D service packet error rate, a D2D service bit error rate, D2D discovery range information, and a number of adjacent terminals discovered by a terminal under a D2D discovery service within unit time.

6. An optimization processing method for a Device-to-Device (D2D) service, comprising:
receiving, by a terminal, first service measurement configuration information from a network side;
acquiring, by the terminal, D2D service information and service experience information about the terminal, or the service experience information according to the first service measurement configuration information, wherein the service experience information is used for reflecting quality of a terminal user' experience on a current service; and
reporting, by the terminal, the D2D service information and the service experience information, or the service experience information to the network side.

7. The method according to claim 6, wherein the D2D service information comprises at least one of followings:
a service type, a serving Public Land Mobile Network (PLMN) of the terminal or a PLMN list allowed by the terminal, frequency point information of a D2D service, a resource allocation type for D2D discovery, a resource allocation type for D2D communication, a D2D communication type, D2D service related time information, and signal quality information or position information of D2D service recording time.

8. The method according to claim 6, wherein the service experience information comprises at least one of followings:
Quality of Service (QoS) measurement information about D2D communication, an average rate of a D2D communication service, a maximum rate of the D2D communication service, a minimum rate of the D2D communication service, a priority of the D2D communication service, D2D service type information, a D2D service block error rate, a D2D service packet error rate, a D2D service bit error rate, D2D discovery range information, and a number of adjacent terminals discovered by a terminal under a D2D discovery service within unit time.

9. The method according to claim 6, wherein receiving, by the terminal, the first service measurement configuration information from the network side comprises one of followings:
receiving, by the terminal, a configuration message, dedicated to sending the first service measurement configuration information, from the network side, and acquiring, by the terminal, the first service measurement configuration information from the configuration message; and
receiving, by the terminal, a cell broadcast message of the network side, and acquiring, by the terminal, the first service measurement configuration information from the cell broadcast message.

10. The method according to claim 9, wherein after the terminal reports the D2D service information and the service experience information, or the service experience information to the network side, the method further comprises:
re-acquiring, when the terminal receives the first service measurement configuration information again, the D2D service information and the service experience information, or the service experience information, or prohibiting from acquiring the D2D service information and/or the service experience information, or the service experience information.

11. The method according to claim 9, wherein when the terminal acquires the D2D service information and service experience information about the terminal, or the service experience information according to the first service measurement configuration information, the method further comprises:
receiving, by the terminal, a second service measurement configuration message;
stopping, by the terminal, current measurement, and discarding the D2D service information and/or service experience information measured and recorded currently; and
re-acquiring, by the terminal, D2D service information and service experience information or the service experience information, according to the second service measurement configuration message, or still acquiring, by the terminal, the D2D service information and service experience information, or the service experience information according to the first service measurement configuration information.

12. The method according to claim 9, wherein after the terminal acquires the D2D service information and service experience information about the terminal, or the service experience information according to the first service measurement configuration information, the method further comprises:
receiving, by the terminal, a third service measurement configuration message;
re-acquiring, by the terminal, D2D service information and service experience information or the service experience information according to the third service measurement configuration message; and
replacing, by the terminal, the D2D service information and service experience information, or the service experience information, acquired according to the first service measurement configuration information, with the re-acquired D2D service information and service experience information, or the service experience information.

13. The method according to claim 6, wherein after the terminal reports the D2D service information and the service experience information, or the service experience information to the network side, the method further comprises:
re-acquiring, when the terminal receives the first service measurement configuration information again, the D2D service information and the service experience information, or the service experience information, or prohibiting from acquiring the D2D service information and the service experience information, or the service experience information.

14. The method according to claim 6, wherein when the terminal acquires the D2D service information and service experience information about the terminal, or the service experience information according to the first service measurement configuration information, the method further comprises:
receiving, by the terminal, a second service measurement configuration message;
stopping, by the terminal, current measurement, and discarding the D2D service information and/or service experience information measured and recorded currently; and
re-acquiring, by the terminal, D2D service information and service experience information, or the service experience information according to the second service measurement configuration message, or still acquiring, by the terminal, the D2D service information and/or service experience information according to the first service measurement configuration information.

15. The method according to claim 6, wherein after the terminal acquires the D2D service information and/or service experience information about the terminal, or the service experience information according to the first service measurement configuration information, the method further comprises:
    receiving, by the terminal, a third service measurement configuration message;
    re-acquiring, by the terminal, D2D service information and service experience information, or the service experience information according to the third service measurement configuration message; and
    replacing, by the terminal, the D2D service information and service experience information, or the service experience information, acquired according to the first service measurement configuration information, with the re-acquired D2D service information and service experience information, or the service experience information.

16. The method according to claim 6, wherein the network side comprises: an evolved Node B (eNB) in a Long Term Evolution (LTE) system or a Radio Network Controller (RNC) under a Universal Terrestrial Radio Access Network (UTRAN).

17. An optimization processing method for a Device-to-Device (D2D) service, comprising:
    sending, by a network side, service measurement configuration information to a terminal; and
    receiving, by the network side, D2D service information and service experience information, or the service experience information acquired by the terminal according to the service measurement configuration information, wherein the service experience information is used for reflecting quality of a terminal user experience on a current service.

18. An optimization processing method for a Device-to-Device (D2D) service, comprising:
    receiving, by an evolved Node B (eNB), service measurement configuration information from a Mobile Management Entity (MME) or a network manager;
    selecting, by the eNB, an appropriate terminal to acquire D2D service information and service experience information, or the service experience information, wherein the service experience information is used for reflecting quality of a terminal user' experience on a current service; and
    locally processing, by the eNB, the D2D service information and service experience information, or the service experience information from the terminal, or sending the D2D service information and service experience information, or the service experience information from the terminal to a Trace Collection Entity (TCE) or a D2D service management network element.

19. The method according to claim 18, wherein the MME comprises: a network element of a Core Network (CN) in a Universal Terrestrial Radio Access Network (UTRAN); and/or, the eNB comprises: a Radio Network Controller (RNC) in the UTRAN; and/or the D2D service management network element comprises: a Proximity Services (ProSe) functional entity or a network element device dedicated to D2D service management.

20. An optimization processing apparatus for a Device-to-Device (D2D) service, which is used in a terminal, and the optimization processing apparatus comprising:
    an acquisition module, configured to acquire D2D service information about the terminal and service experience information, or the service experience information about the terminal, wherein the service experience information is used for reflecting quality of a terminal user experience on a current service; and
    a reporting module, configured to report the D2D service information and/or service experience information or the service experience information to a network side.

* * * * *